United States Patent [19]

Eschbach

[11] Patent Number: 5,045,952
[45] Date of Patent: Sep. 3, 1991

[54] METHOD FOR EDGE ENHANCED ERROR DIFFUSION

[75] Inventor: Reiner Eschbach, Fairport, N.Y.

[73] Assignee: Xerox Corporation, Stamford, Conn.

[21] Appl. No.: 396,272

[22] Filed: Aug. 21, 1989

[51] Int. Cl.$^5$ ............................................. H04N 1/40
[52] U.S. Cl. ..................................... 358/447; 358/455; 358/466
[58] Field of Search ............... 358/455, 447, 463, 443, 358/456, 466

[56] References Cited

U.S. PATENT DOCUMENTS

| | | | |
|---|---|---|---|
| 4,256,401 | 3/1981 | Fujimura et al. | 355/14 E |
| 4,625,222 | 11/1986 | Bassetti et al. | 346/160 |
| 4,672,463 | 6/1987 | Tomohisa et al. | 358/284 |
| 4,693,593 | 9/1987 | Gerger | 355/14 CH |
| 4,700,229 | 10/1987 | Herrmann | 358/447 |
| 4,709,250 | 11/1987 | Takeuchi | 346/160 |
| 4,724,461 | 2/1988 | Rushing | 355/14 D |
| 4,748,515 | 5/1988 | Van Daele et al. | 358/447 |

OTHER PUBLICATIONS

Article "An Adaptive Algorithm for Spatial Greyscale by R. W. Floyd et al. in the Proceedings of the Society for Information Display", vol. 17; 1976.
Article "On The Error Diffusion Technique for Electronic Halftoning" by C. Billotet-Hoffmann-et al. published in the Proceedings of the SID, vol. 24/3; 1983.

*Primary Examiner*—Edward L. Coles, Sr.
*Attorney, Agent, or Firm*—Duane C. Basch; Ronald F. Chapuran

[57] ABSTRACT

A method of dynamically adjusting the threshold level of an error diffusion algorithm to selectively control the amount of edge enhancement introduced into the encoded output. The threshold level is selectively modified on a pixel by pixel basis and may be used to increase or decrease the edge enhancement of the output digital image, thus, more closely representing the original detail and edge sharpness of the continuous tone input image.

11 Claims, 4 Drawing Sheets

METHOD FOR EDGE ENHANCED ERROR DIFFUSION

BACKGROUND OF THE INVENTION

1. Field of the Invention

The present invention relates to the representation of digital image data, and in particular, to the binary or multilevel representation of images for display purposes.

2. Description of the Prior Art

The representation of continuous tone pictorial data in a binary format is a major concern as the need increases to transmit and display images. The binary representation of image information is desired in order to reduce the sensitivity to noise in transmission and storage or to enable the accurate depiction of continuous tone originals with binary media. In the general field of digital halftoning, there have been disclosed different methods to convert continuous tone to binary images in such a manner as to preserve the appearance of tonal gradation similar to the original image. For example, U.S. Pat. No. 4,625,222 to Bassetti et al. discloses a print enhancement control system for an electrostatic copying machine wherein control logic circuitry processes a set of image altering parameters to improve image production quality. These parameters, whose values are either predetermined, fixed or have been received from an exterior source, improve image quality (i.e., resolution) by modifying modulated gray signals.

U.S. Pat. No. 4,700,229 to Herrmann et al. discloses an image enhancement circuit which converts a low quality image signal into a high quality image signal by modifying the binary representation of a picture. Image enhancement is accomplished by multiplying a series of error difference signals by a series of weighting factors k(i) which produce a clearer image by improving picture resolution.

U.S. Pat. No. 4,672,463 to Tomohisa et al. discloses a method to improve image quality within an electrostatic reproduction machine wherein the sharpness of an image is improved based on the value of an image sharpness control parameter that has been calculated examining the copy quality of an original.

U.S. Pat. No. 4,709,250 to Takeuchi discloses an image forming apparatus which improves the halftone image quality of an original. The pulse width of a reference control signal controls and improves image quality in response to a detected image density signal.

U.S. Pat. No. 4,724,461 to Rushing discloses an image improving process control for an electrostatic copying machine which maintains high image quality by adjusting a set of process control parameters.

U.S. Pat. No. 4,256,401 to Fujimura et al. discloses an image density adjustment method wherein a predetermined image density level within an electrostatic copying machine is maintained at a standard density by varying a set of input control parameters.

U.S. Pat. No. 4,693,593 to Gerger discloses a method of improving the image quality by controlling a single process parameter in response to changes in sensitometric characteristics of an image transfer member.

These systems, although providing some degree of image improvement, generally do not provide the means to control the edge enhancement of regions within the image.

Other prior work, such as shown in the Proceedings of the Society for Information Display, Volume 17, 1976, includes a numerical screening algorithm, the Floyd and Steinberg error diffusion algorithm, as a coding technique for the binary encoding of greyscale image data. Modifications to the Floyd-Steinberg algorithm may, as shown by Billotet-Hoffman and Bryngdahl in the Proceedings of the Society for Information Display, Volume 24, 1983, include a varying threshold, a dither, instead of a fixed threshold. This visually decodable technique is presently utilized, for example, in computer displays where the resolution of the output device is limited. The adaptive nature of the Floyd-Steinberg algorithm automatically provides a sharp, edge-enhanced appearance which, while visually appealing, may not necessarily be desirable in the output image.

A difficulty with the Floyd-Steinberg error diffusion algorithm is that an inherent edge enhancement is built into the algorithm. Analysis of the output of the Floyd-Steinberg error diffusion algorithm illustrates a characteristic overshoot (too dark or too light) at upward and downward transitions, or steps, in the continuous tone digital image data. As used within this specification, continuous tone refers to input data that has been quantized to a larger number of discrete values than intended for the output data.

It is an object of the present invention, therefore, to be able to adjust the edges of a given digital image in a manner to improve the overall appearance of the image. It is another object of the present invention to selectively increase or decrease the amount of edge enhancement in a given digital image using a modified error diffusion algorithm for the encoding of the continuous tone input data. Further advantages of the present invention will become apparent as the following description proceeds and the features characterizing the invention will be pointed out with particularity in the claims annexed to and forming a part of this specification.

SUMMARY OF THE INVENTION

Briefly, the present invention is a method of dynamically adjusting the threshold of an error diffusion algorithm to selectively control the amount of edge enhancement introduced into the binary encoded output. The threshold level is selectively modified on a pixel by pixel basis and may be used to increase or decrease the edge enhancement of the output digital image, thus, more closely representing the original detail and edge sharpness of the continuous tone input image, or to improve the perceived quality of the image which might be achieved by intentionally deviating from a faithful representation.

BRIEF DESCRIPTION OF THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1:
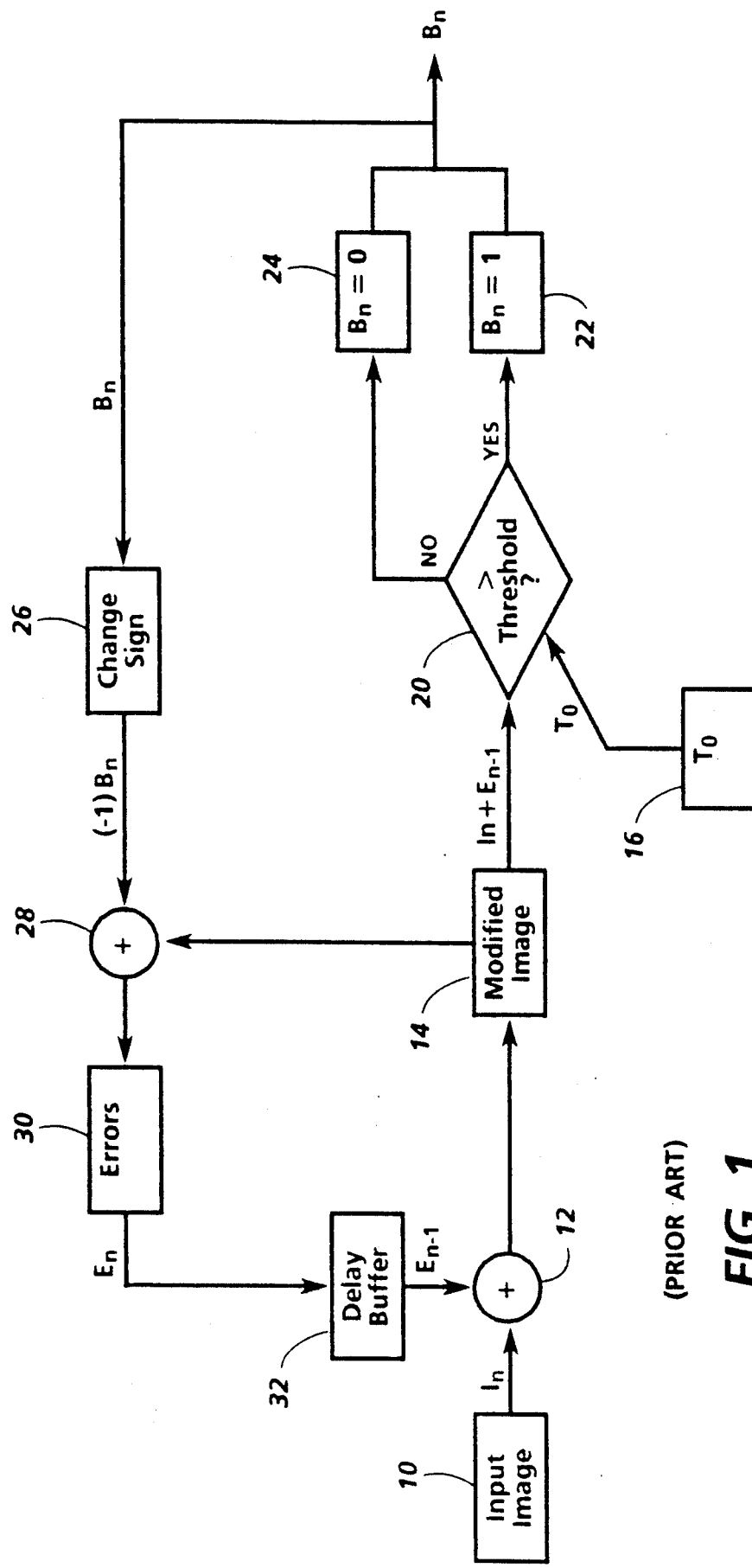
FIG. 1 is a prior art block diagram illustrating the 1-dimensional error diffusion technique.

With respect to FIG. 1, there is shown a generalized block diagram illustrating the prior art Floyd-Steinberg error diffusion algorithm for displaying continuous tone digital images. The algorithm has been simplified to a 1-dimensional representation for clarity, however, it should be recognized that the algorithm is extensible to multidimensional systems. The algorithm may be expressed as, $$B(n) = \text{step}\left[ I(n) + \sum_{i=0}^{n-1} \{I(i) - B(i)\} - T_0 \right] \quad (1)$$

where the output signal $B(n)$ is a function of the input signal $I(n)$ and a threshold $T_0$.

The error diffusion algorithm is implemented using the constant threshold level $T_0$ to encode the continuous tone input image. The thresholding, or clipping, of the input pixel results in an output pixel level and an associated error value. The error value is allocated to subsequent pixels based upon an appropriate weighting scheme. Various weighting techniques may be used, for distribution of the error value, to modify the output image generated using the error diffusion algorithm.

With respect to FIG. 1, the image input block 10 introduces the input digital image $I_n$ into the system on a pixel by pixel basis, where n represents the input image pixel number. Each input pixel has its corresponding error value $E_{n-1}$ added to the input value $I_n$ at adder block 12, resulting in the modified image block 14, where $E_{n-1}$ is the error value of the previous pixel $(n-1)$. The modified image data, the sum of the input value and the error value of the previous pixel $(I_n + E_{n-1})$, is passed to the threshold comparator 20. The modified image data is compared to the constant threshold value $T_0$, from block 16, to determine the appropriate output level $B_n$, 22 or 24. Once the output level $B_n$ is determined, it is subtracted from the modified image value to generate the error level $E_n$ for the subsequent input pixel. The subtraction operation is represented by the sign inversion block 26 and subsequent adder block 28, with $E_n$ representing the difference between the modified image value $(I_n + E_{n-1})$ and the output value $B_n$ for pixel n, as represented by error block 30. The delay buffer block 32 represents a single pixel delay to store $E_n$ in the simplified 1-dimensional situation. However, a multidimensional implementation would require a larger delay block 32 capable of summing and storing multiple weighted error values.

Figure 2A:
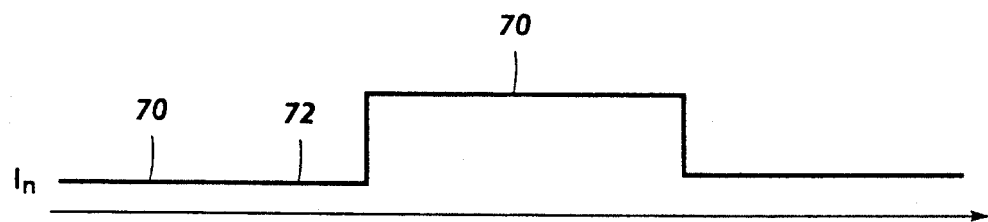
FIGS. 2a–2c are illustrations of the input and corresponding signal output for the prior art technique.
Figure 2B:
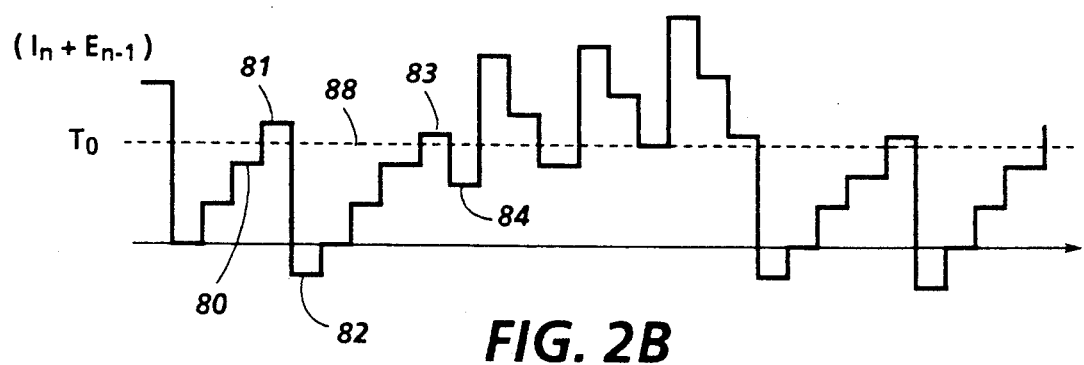
Figure 2C:
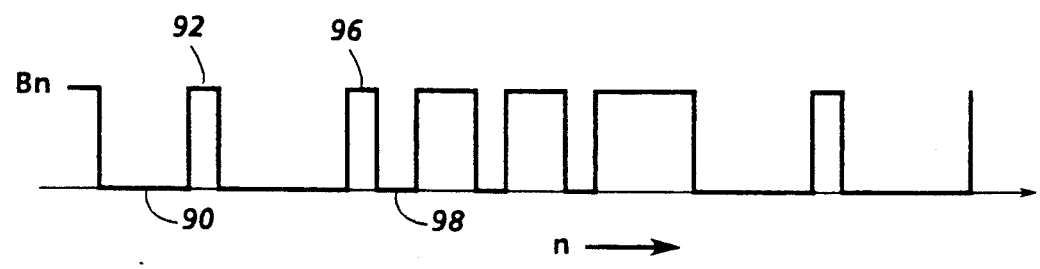

The cyclical processing of pixels is continued until the end of the continuous tone input data is reached. FIG. 2 illustrates the processing stages of a portion of a typical scanline, with n representing the input image pixel number. In FIG. 2a, $I_n$ denotes the value of the continuous tone digital input pixels. The modified image value, including the input and error, is represented by $(I_n + E_{n-1})$, with a constant threshold $T_0$ superimposed as a dashed line in FIG. 2b. At any point in FIG. 2b that the modified image value $(I_n + E_{n-1})$ exceeds the threshold level $T_0$, a binary pulse will be output as indicated by curve $B_n$ in FIG. 2c. Specifically, in FIG. 2b, $(I_n + E_{n-1})$ level 80 is below the $T_0$ threshold level 88, resulting in $B_n$ output level 90 in FIG. 2c and an error $E_n$ equal to the difference between $(I_n + E_{n-1})$ and $B_n$. Processing of the subsequent input image pixel $(n+1)$ provides a modified image value 82 in FIG. 2b which is above the $T_0$ threshold level 88. This results in an output level $B_{n+1}$ indicated by 92 in FIG. 2c. The error value to be associated with the following pixel will again be determined by the difference between $(I_{n+1} + E_{(n-1)+1})$ and $B_{n+1}$, where $B_{n+1}$ is now unity. The modified image value for input pixel $(n+2)$ is indicated by level 84 in FIG. 2b. Continued processing of the input pixels in FIG. 2a would eventually result in a $(I_n + E_{n-1})$ modified image value 83 exceeding the $T_0$ threshold level 88 and a resultant $B_n$ output level 96. Here, $B_n$ is set to 1 immediately before an $I_n$ input edge transition 72 to 74, resulting in $(I_n + E_{n-1})$ modified image value 84 below $T_0$ threshold 88 and an output level $B_n = 0$ at 98. The upward transition, 72 to 74, in input level $I_n$ is thus encoded as a downward transition, 96 to 98 in the $B_n$ output level.

In an embodiment of the system according to the present invention, identification of $I(n)$ and $T_0$ as independent components of the algorithm allows the representation of the algorithm for encoding of a continuous tone digital image by the expression.

$$B(n) = \text{step}\left[ \sum_{i=0}^{n-1} \{I(i) - B(i)\} - T\{I(n),n\} \right] \quad (2)$$

where $B(n)$ represents the output of the modified error diffusion algorithm. The threshold term T is shown as a function of both $I(n)$ and n, where n represents the respective pixel position in the input image scanline. This illustrates an additional degree of freedom that can be used to adapt the local pulse distribution to the digital image output requirements, such as controlling edge enhancement. Specific methods for the calculation of threshold T are indicated by the expressions.

$$T\{I(n),n\} = T_0 + (K/(2N+1))\left( \sum_{i=n-N}^{n+N} a_i I(i) \right). \quad (3a)$$

$$T\{I(n),n\} = T_0 - (K-1)I(n) \quad (3b)$$

where $T_0$ is a constant such that $0 \leq T_0 \leq 1$, $a_i$ is a weighting factor and N is an arbitrary nonnegative integer. The enhancement factor K may be held constant or may vary as a function of the input image content, local or global, within the continuous tone input image. Choices for $T\{I(n),n\}$ include, but are not limited to expressions 3a and 3b above.

Figure 3:
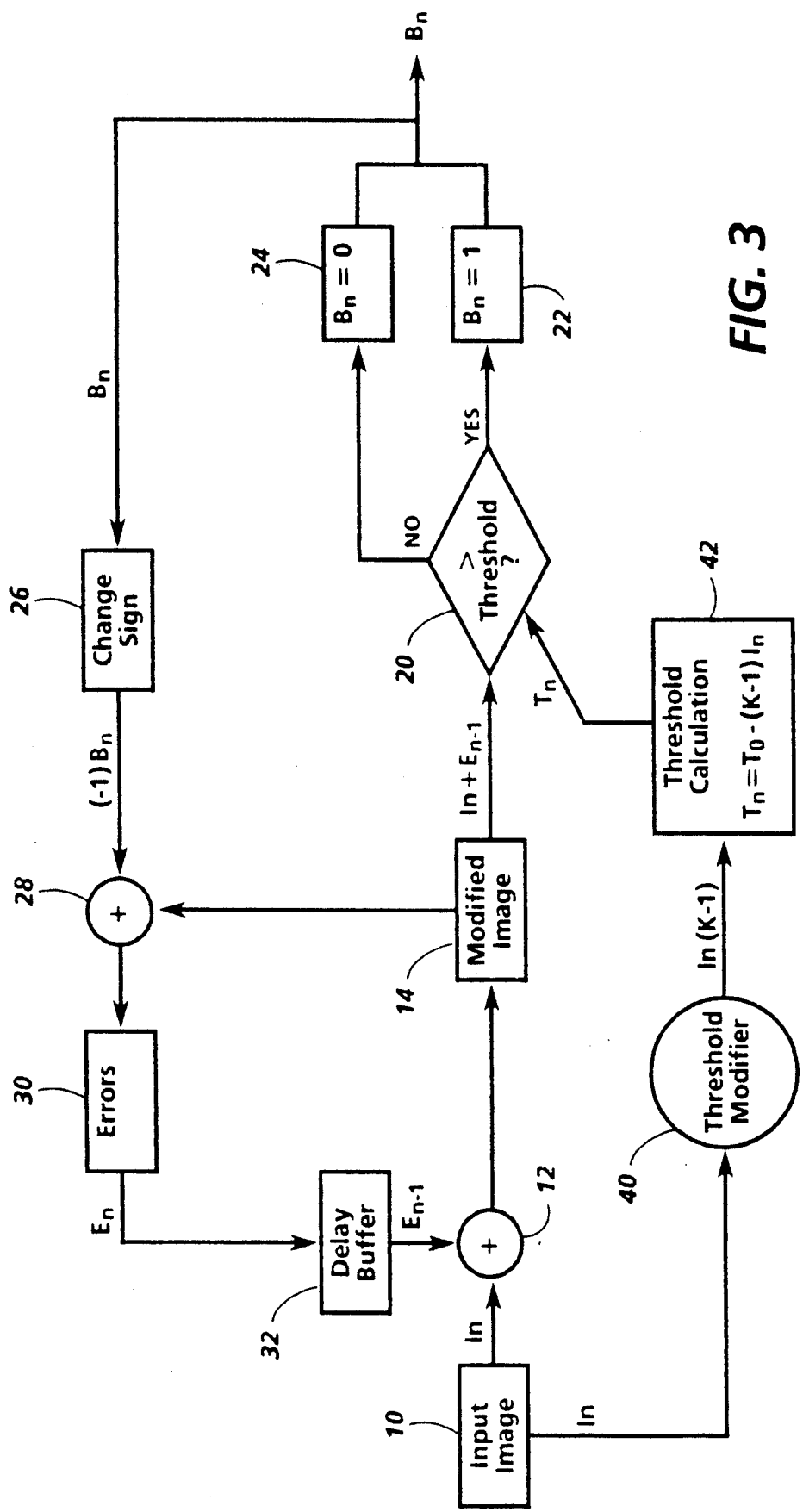
FIG. 3 is a general flow chart of the edge enhancement system in accordance with the present invention.

With reference to FIG. 3, there is shown a general flow chart of an embodiment of the system according to the present invention, using the expressions 2 and 3b above. The image input block 10 introduces the input digital image $I_n$ into the system on a pixel by pixel basis. Each input pixel has its corresponding error $E_{n-1}$ added to the input value at adder 12, prior to passing the sum to the modified image block 14. The modified image data, the sum of the input value and the error value of the previous input pixel $(I_n + E_{n-1})$, is passed to the threshold comparator block 20.

The modified threshold level $T_n$ is determined by first calculating a modifier based on the input value $I_n$ of each pixel, as represented in the threshold modifier block 40. The modifier value $I_n(K-1)$ is then substracted from the nominal threshold value $T_0$, in the threshold calculation block 42, to determine the threshold value $T_n$ to be applied at the threshold comparator block 20. Alternatively, it is possible to accomplish an equivalent alteration of the threshold through the addition of the modifier value $I_n(K-1)$ to the modified image value $(I_n+E_{n-1})$ while maintaining the threshold value at its nominal level $T_0$.

The modified image value $(I_n+E_{n-1})$ is compared to the modified threshold level $T_n$ to determine the appropriate output level $B_n$ via blocks 22 and 24. Output level $B_n$ is then substracted from the modified image value $(I_n+E_{n-1})$ to determine the error level $E_n$ for the subsequent input pixel. The subtraction operation is represented by the sign inversion block 26 and subsequent add block 28, with $E_n$, at error block 30, representing the difference between the modified image value $(I_n+E_{n-1})$ and the output value $B_n$. The delay buffer block 32 represents a single pixel delay to store $E_n$ in the simplified 1-dimensional situation.

Figure 4A:
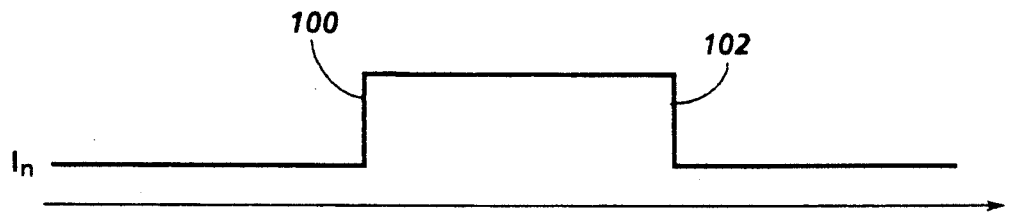
FIGS. 4a–4c are illustration of the input and corresponding signal output of the system in FIG. 3 in accordance with the present invention.
Figure 4B:
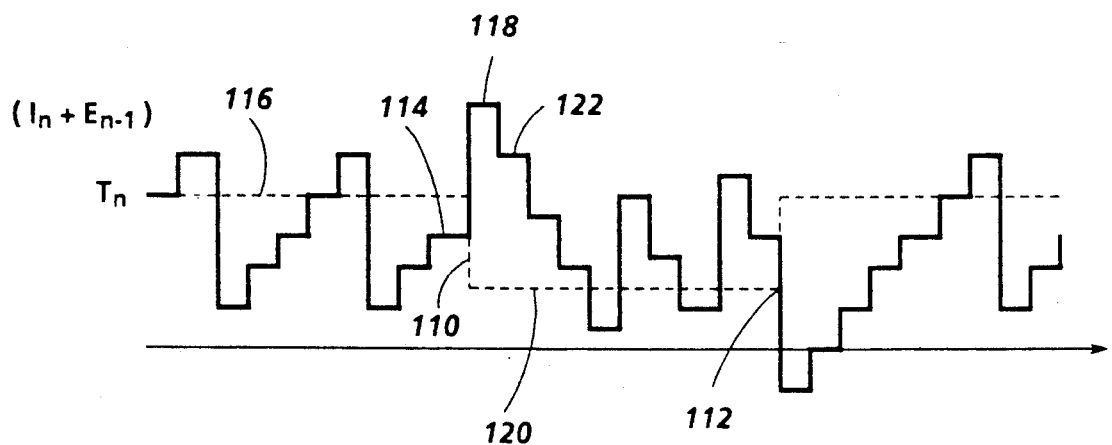
Figure 4C:
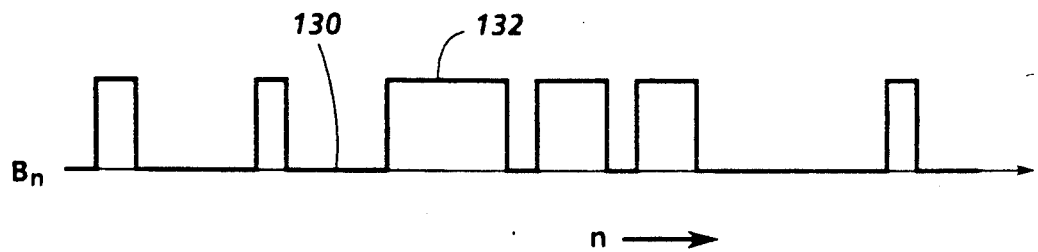

An illustration of the data associated with the processing of a scanline is shown in FIG. 4. The input value $I_n$ is shown in FIG. 4a, with two typical transition steps 100 and 102. The corresponding modified image values $(I_n+E_{n-1})$ are illustrated in FIG. 4b for the progression of successive pixels, with the modified threshold level $T_n$ superimposed as a dashed line. The transition points 110 and 112 for the threshold $T_n$ correspond with transitions 100 and 102 of $I_n$ due to the fact that the threshold level $T_n$ is now a function of $I_n$, from expression 3b above. At any point that the modified image value $(I_n+E_{n-1})$ exceeds the threshold level $T_n$, a binary pulse will be output as indicated by curve $B_n$ in FIG. 4c. Specifically, in FIG. 4b the modified image value $(I_n+E_{n-1})$ at 114 is below the threshold level $T_n$ 116, resulting in an output level $B_n$ at 130 as illustrated in FIG. 4c.

Processing of the subsequent input image pixel (n+1) provides a modified image value 118, as shown in FIG. 4b. The modified image value $(I_{n+1}+E_{(n-1)+1})$ 118 is compared to the threshold $T_{n+1}$, now at level 120 due to the change in the input pixel level $I_{n+1}$ at transition 100. The modified image value $(I_{n+1}+E_{(n-1)+1})$ exceeds the threshold level $T_{n+1}$ resulting in an output level $B_{n+1}$ at 132. Subsequent pixels, for example pixel (n+2) whose modified image value is indicated by 122, will be processed with the lower threshold level $T_{n+2}$, indicated by 120, until another image input transition 102 occurs causing the threshold transition 112. Through the modification of the threshold level $T_n$ at input image transition points 100, 102, there is provided specific control of the amount of edge enhancement produced in this modified error diffusion technique.

While the embodiment described herein is limited to a 1-dimensional representation for the sake of simplified explanation, it should be understood that this technique is designed and intended for use in a multidimensional situation, where the display implementation represents a 2-dimensional situation and the display of time varying data represents a 3-dimensional situation. In addition, use of multiple threshold values T will allow generation of output for any multilevel output display, not being limited to the binary output as described. Furthermore, the threshold level T, while illustrated as a function of a single input pixel, can be implemented as a function of a plurality of input pixels representing a region or neighborhood within the continuous tone input image.

The embodiment described herein can also be expanded to include composite images, such as color images, where each color component might be treated individually by the algorithm, or where a vector quantization technique may be used to treat the image in a composite manner. In the case of color input images, edge enhancement could be used to control the color difference at a color transition while minimizing any effects on the brightness at that location. Further expansion of this embodiment, in the area of computer generated holograms, would enable control of the edge enhancement of an input image to modify the amount of light diffracted into the desired order.

While there has been illustrated and described what is at present considered to be a preferred embodiment of the of the present invention, it will be appreciated that numerous changes and modifications are likely to occur to those skilled in the art, and it is intended in the appended claims to cover all those changes and modifications which fall within the true spirit and scope of the present invention.

I claim:

1. In a system for manipulating and displaying digital images represented by a plurality of pixels, each pixel having a given value, the system having a memory for digitally storing the image pixels and a screen for displaying an image as a raster of pixels having a plurality of output states, the method of image encoding including the steps of:
   (a) comparing the value of the pixel, read from memory, with a threshold,
   (b) generating the output state for the pixel depending upon the relationship of the pixel value relative to the threshold,
   (c) displaying the output state of the pixel on the display screen,
   (d) calculating a variance value indicative of the deviation of the pixel value from the output state,
   (e) storing the variance value,
   (f) combining the variance value stored in step e with the next pixel value stored in memory to produce a new pixel value,
   (g) repeating steps b through f for each pixel within the digital image memory, thereby producing an encoded display image representative of the stored digital image, and
   selectively changing the threshold used in steps a and b by analyzing the value of each pixel read from memory in order to determine if the threshold level should be changed.

2. The method of claim 1 wherein the values of the pixels stored in memory are greyscale levels.

3. The method of claim 1 wherein the values of the pixels stored in memory are color values.

4. The method of claim 1 wherein the pixel output state is determined by comparison to a plurality of thresholds, thereby enabling the generation of a plurality of output states.

5. The method of claim 1 wherein the step of selectively changing the threshold further comprises the steps of:
   determining a threshold modifier valve based upon the pixel valve,
   substracting the threshold modifier valve from a nominal threshold valve to determine the threshold.

6. In a system for manipulating and displaying digital greyscale images represented by a plurality of pixels, the system having a memory for digitally storing the greyscale image pixels and a screen for displaying the image as a raster of pixels having either a 0 or a 1 output state, the method of enhancing the edges of the displayed image, including the steps of:

(a) reading a first greyscale image pixel value from memory, (b) determining the 0 or 1 output state of the pixel depending upon the relationship of the pixel greyscale level to a threshold level, (c) displaying the output state of the pixel as determined in step b, (d) comparing the greyscale level of said first pixel with reference to the 0 or 1 output state to determine the variance of the greyscale level from the output state, (e) reading, in a sequential fashion, the next greyscale image pixel value from memory, (f) introducing the variance of the first pixel greyscale level from the output state into the deviation of the next pixel greyscale level from the threshold level to determine the 0 or 1 output state of the second greyscale pixel, wherein the improvement comprises the step of analyzing the greyscale level of each pixel in order to determine if the threshold level should be changed, and (g) repeating steps b through f for all pixels within the memory, thereby producing an edge enhanced representation of the digital greyscale image suitable for display by a binary output device.

7. In a system for displaying digital images represented by a plurality of pixels, each pixel having a given value, the system having a memory for digitally storing the image pixels and a screen for displaying an encoded digital image as a raster of pixels having a plurality of encoded states, the method of image encoding by comparing the values of each pixel in sequence with a threshold to determine the encoded states of said pixels, including the steps of:

retrieving from memory, in seriatim, the values which are representative of the image pixels, generating the encoded states of the pixels by comparing the representative digital values with one or more thresholds, displaying the encoded states of the pixels on the screen, determining the variance of the values of each pixel from the encoded state of said pixels, storing the variance in a delay buffer, introducing the previously stored variance of each pixel value into the digital value of each successive pixel value to produce a modified value, comparing the modified value of each pixel, which includes the variance of the preceding pixel, to the thresholds to determine the encoded state of the pixel, and selectively changing the thresholds during the image encoding by analyzing the values of pixels within a neighborhood of pixels to determine if the thresholds should be changed.

8. The method of claim 7 wherein the step of introducing the variance includes the step of adding the variance of each pixel from the encoded state to the variance of all previous pixels from the encoded state of said previous pixel.

9. The method of claim 7 wherein the given valves are pixel greyscale levels.

10. The method of claim 7 wherein the given valves are pixel color valves.

11. A technique for manipulating a digital image represented by a plurality of pixels stored in memory, each of the pixels having an associated greyscale level, to provide edge enhancement of the image for display as a raster of said pixels, each pixel of the raster represented by a 0 or 1 encoded state, including the steps of:

reading a first image pixel greyscale level from memory, comparing the greyscale level of the first pixel with a reference greyscale threshold level, determining the 0 or 1 encoded state of said first image pixel depending upon the relationship of the pixel greyscale level to the threshold level, displaying the encoded state of said first image pixel, calculating the variance of the first pixel greyscale level from the encoded state, reading a second image pixel greyscale level from memory, comparing the greyscale level of the second image pixel with the reference greyscale threshold level, and determining the 0 or 1 encoded state of said second pixel depending upon the relationship of the pixel greyscale level of the second pixel to the threshold level in conjunction with the variance of the first pixel greyscale level from the encoded state, wherein the improvement comprises the step of selectively adjusting the reference greyscale threshold level for selected pixels in response to the greyscale level of said selected pixels.

* * * * *